United States Patent
Rinaldi

(10) Patent No.: US 7,603,025 B2
(45) Date of Patent: *Oct. 13, 2009

(54) METHOD AND APPARATUS FOR COPY PROTECTION DETECTION IN A VIDEO SIGNAL

(75) Inventor: Antonio Rinaldi, Maple (CA)

(73) Assignee: ATI Technologies SRL, Christ Church (BB)

(*) Notice: Subject to any disclaimer, the term of this patent is extended or adjusted under 35 U.S.C. 154(b) by 987 days.

This patent is subject to a terminal disclaimer.

(21) Appl. No.: 10/731,217

(22) Filed: Dec. 9, 2003

(65) Prior Publication Data

US 2004/0114907 A1     Jun. 17, 2004

Related U.S. Application Data

(62) Division of application No. 09/316,442, filed on May 21, 1999, now Pat. No. 6,690,880.

(51) Int. Cl.
*H04N 7/00* (2006.01)
*H04N 7/167* (2006.01)
*H03L 7/00* (2006.01)
*G11B 19/04* (2006.01)

(52) U.S. Cl. .................. 386/95; 348/465; 348/545; 360/60; 380/201

(58) Field of Classification Search ............ 386/94, 386/E5.004; 348/465, 545; 360/60; 380/201
See application file for complete search history.

(56) References Cited

U.S. PATENT DOCUMENTS

| 4,531,228 A | 7/1985 | Noso et al. |
| 4,593,384 A | 6/1986 | Kleijne |
| 4,819,098 A | 4/1989 | Ryan |
| 4,839,745 A | 6/1989 | Tindall |
| 4,914,694 A | 4/1990 | Leonard et al. |
| 4,945,563 A | 7/1990 | Horton et al. |

(Continued)

FOREIGN PATENT DOCUMENTS

EP     0574892 B1     12/1993

(Continued)

OTHER PUBLICATIONS

European Search Report for Application EP 00304257.9-2002; European Patent Office; dated May 6, 2002.

(Continued)

*Primary Examiner*—Thai Tran
*Assistant Examiner*—Syed Y Hasan
(74) *Attorney, Agent, or Firm*—Vedder Price PC

(57) ABSTRACT

A method and apparatus for detecting copy protection included in an input video signal is described. Two types of copy protection are particularly addressed, including techniques that imbed copy protection pulses and copy protection phase flips in the video signal. A method for preserving copy protection is also presented, where the input video signal is first examined to determine if copy protection has been included in the input video signal. The input video signal then converted to component video data, which removes any copy protection present. An output video signal is then generated from the component video data, and when it was determined that the input video signal includes copy protection, the copy protection is recreated in the output video signal.

4 Claims, 6 Drawing Sheets

U.S. PATENT DOCUMENTS

| | | | |
|---|---|---|---|
| 5,194,965 A | 3/1993 | Quan et al. | |
| 5,231,546 A | 7/1993 | Shimada | |
| 5,315,448 A | 5/1994 | Ryan | |
| 5,319,705 A | 6/1994 | Halter et al. | |
| 5,367,330 A | 11/1994 | Haave et al. | |
| 5,404,172 A * | 4/1995 | Berman et al. | 348/465 |
| 5,418,853 A | 5/1995 | Kanota et al. | |
| 5,510,900 A | 4/1996 | Shirochi et al. | |
| 5,548,599 A | 8/1996 | Furuhashi et al. | |
| 5,550,863 A | 8/1996 | Yurt et al. | |
| 5,568,551 A | 10/1996 | Kawashima | |
| 5,574,787 A | 11/1996 | Ryan | |
| 5,585,929 A | 12/1996 | Young et al. | |
| 5,596,372 A * | 1/1997 | Berman et al. | 348/537 |
| 5,599,231 A | 2/1997 | Hibino et al. | |
| 5,621,579 A | 4/1997 | Yuen | |
| 5,638,443 A | 6/1997 | Stefik et al. | |
| 5,694,381 A | 12/1997 | Sako | |
| 5,715,403 A | 2/1998 | Stefik | |
| 5,719,937 A | 2/1998 | Warren et al. | |
| 5,737,415 A | 4/1998 | Akiyama et al. | |
| 5,748,733 A | 5/1998 | Quan | |
| 5,760,844 A * | 6/1998 | Jorden | 348/691 |
| 5,764,964 A | 6/1998 | Dwin et al. | |
| 5,778,064 A | 7/1998 | Kori et al. | |
| 5,799,081 A | 8/1998 | Kim et al. | |
| 5,825,879 A | 10/1998 | Davis | |
| 5,844,615 A | 12/1998 | Nuber et al. | |
| 5,889,919 A | 3/1999 | Inoue et al. | |
| 5,982,977 A | 11/1999 | Naruse et al. | |
| 6,023,302 A | 2/2000 | MacInnis et al. | |
| 6,034,931 A | 3/2000 | Miwa et al. | |
| 6,206,691 B1 * | 3/2001 | Lehmann et al. | 433/26 |
| 6,256,390 B1 | 7/2001 | Okuyama et al. | |
| 6,278,733 B1 | 8/2001 | Bennett et al. | |
| 6,327,422 B1 | 12/2001 | Quan et al. | |
| 6,328,567 B1 * | 12/2001 | Morris et al. | 433/215 |
| 6,330,393 B1 | 12/2001 | Usui et al. | |
| 6,347,846 B1 | 2/2002 | Nakamura | |
| 6,351,439 B1 | 2/2002 | Miwa et al. | |
| 6,356,704 B1 | 3/2002 | Callway et al. | |
| 6,384,917 B1 * | 5/2002 | Fradkin | 356/402 |
| 6,389,220 B2 | 5/2002 | Usui et al. | |
| 6,437,830 B1 | 8/2002 | Horlander | |
| 6,449,425 B1 | 9/2002 | Ogino | |
| 6,473,560 B1 | 10/2002 | Linnartz et al. | |
| 6,487,363 B1 | 11/2002 | Ogino et al. | |
| 6,606,450 B1 | 8/2003 | Klebanoy et al. | |
| 6,690,880 B1 | 2/2004 | Rinaldi | |
| 2002/0034252 A1 | 3/2002 | Owen et al. | |

FOREIGN PATENT DOCUMENTS

| | | |
|---|---|---|
| EP | 0580367 B1 | 1/1994 |
| EP | 0581227 A2 | 2/1994 |
| EP | 0814474 A1 | 12/1997 |
| EP | 0854648 A2 | 7/1998 |
| EP | 0942418 A1 | 9/1999 |
| EP | 0854648 A3 | 12/1999 |
| WO | 95/15660 | 6/1995 |
| WO | 97/43853 | 11/1997 |
| WO | 98/16926 | 4/1998 |

OTHER PUBLICATIONS

European Search Report for Application EP 00307709.6; European Patent Office; dated Jun. 14, 2002.

* cited by examiner

METHOD AND APPARATUS FOR COPY PROTECTION DETECTION IN A VIDEO SIGNAL

RELATED APPLICATIONS

This application is a divisional application of application Ser. No. 09/316,442 entitled "Method and Apparatus for Copy Protection Detection in a Video Signal", having inventor Antonio Rinaldi, filed on May 21, 1999, now U.S. Pat. No. 6,690,880, and owned by the instant assignee. This invention is related to the invention disclosed in a patent application entitled "Method and Apparatus for Processing Video Signals Having Associated Access Restriction Data", U.S. Pat. No. 6,606,450, which was issued Aug. 12, 2003 and has a filing date of May 21, 1999.

TECHNICAL FIELD OF THE INVENTION

The invention relates generally to video signals, and more particularly to detection of copy protection included in video signals.

BACKGROUND OF THE INVENTION

Video signals may originate from a number of different sources including a videocassette recorder (VCR), digital video disc (DVD) player, etc. In order to prevent users from making unauthorized copies or derivations of protected works included in video signals, copy protection techniques have been developed that prevent such video signals from being recorded on standard recording devices such as VCRs. These copy protection techniques allow the signal to be utilized for display purposes, but prevent recording devices such as VCRs from accurately recording all of the information in the video stream.

As video graphics processing circuits continue to evolve, additional capabilities that allow video signals to be provided to a number of different outputs of the circuits exist. In such systems, the video signals are often broken down into their component parts and stored in memory. When video signals are broken down in such a manner, the techniques utilized to implement copy protection in the video signal are often defeated.

In some instances, the output data stream of the video processing circuitry is not provided to a device capable of recording the information included in the video signal. In such instances, defeating the copy protection included in the video signal is not an issue. However, if the video signal is reconstructed from the component data and provided to an output that may be connected to a VCR or other recording capable device, the video graphics circuitry has effectively removed the copy protection from the video stream. As such, this allows for unauthorized copies or derivations to be produced, which is undesirable.

Therefore, a need exists for a method and apparatus that is able to detect copy protection included in a video graphics stream and ensure that when it is present unauthorized copies or derivations of information included in the video stream are not permitted.

DETAILED DESCRIPTION OF A PREFERRED EMBODIMENT OF THE INVENTION

Generally, the present invention provides a method and apparatus for detecting copy protection included in an input video signal. Two types of copy protection are particularly addressed, including techniques that imbed copy protection pulses and copy protection phase flips in the video signal. Techniques for detecting each of these two types of copy protection are described. A method for preserving copy protection is also presented, where the input video signal is first checked to determine if copy protection has been included in the input video signal. The input video signal then converted to component video data, which removes any copy protection present. An output video signal is then generated from the component video data, and when it was determined that the input video signal includes copy protection, the copy protection is recreated in the output video signal.

By allowing for copy protection included in video signals to be detected, steps can be taken to ensure that the intent of the copy protection is upheld. As such, if the input video signal is converted to component video data and then provided to an output that may be coupled to a recording device, the copy protection included in the input signal can be recreated in the output video stream. Similarly, in the case where a computer or other processing device can capture images within the input video stream, the presence of copy protection can cause the processor to disallow these image capturing functions that record or copy portions of the video stream. By upholding the intent of the copy protection included in the video stream, producers of copy protected materials can be reassured that video graphics processing devices designed to work with such media will not enable users to make unauthorized copies or derivations of copy protected works.

Figure 1:
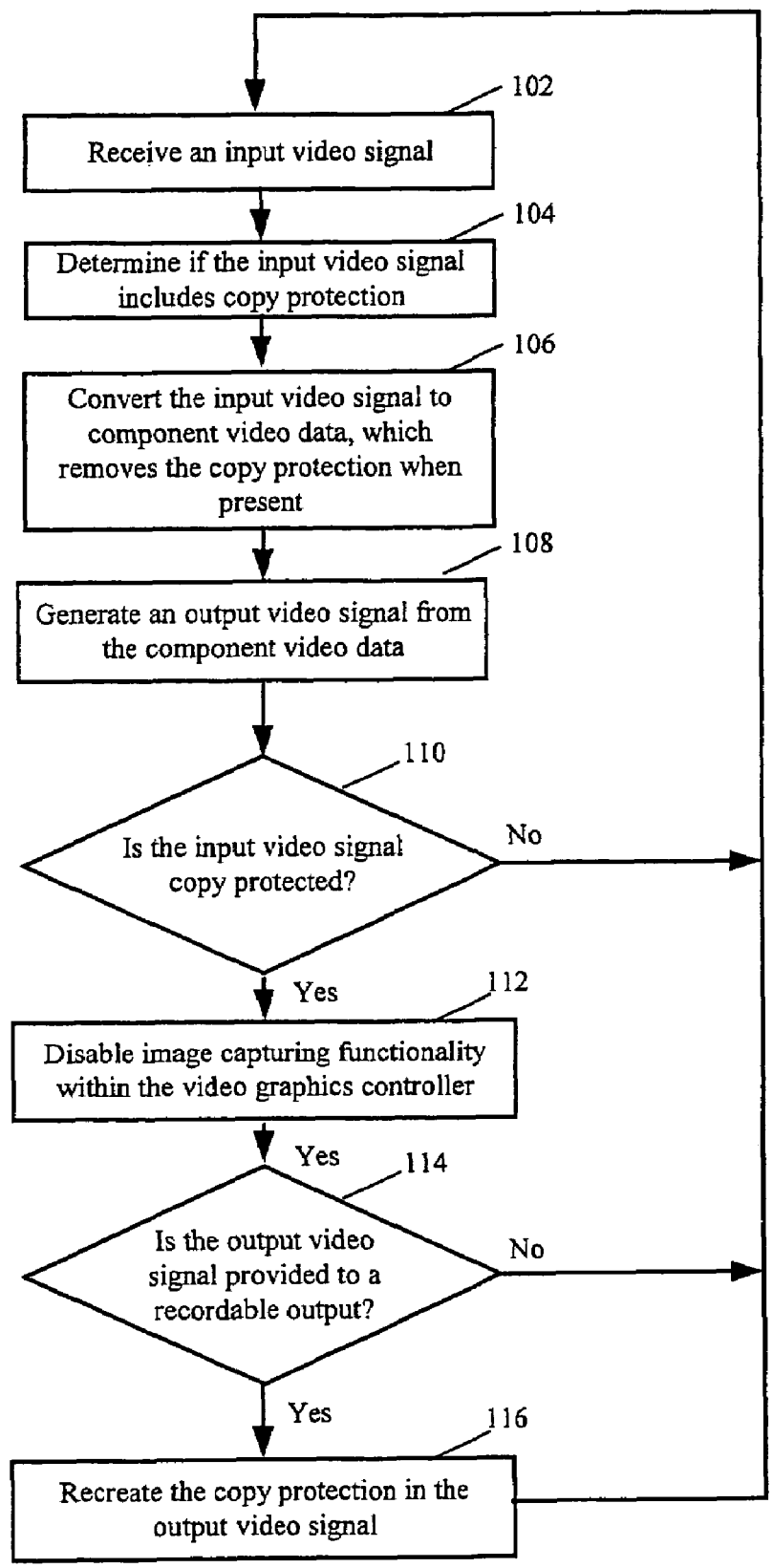
FIG. 1 illustrates a flow diagram of a method for preserving copy protection in an input video signal in accordance with the present invention.

The invention can be better understood with reference to FIGS. 1-9. FIG. 1 illustrates a method for preserving copy protection in an input video signal. The input video signal may be derived from a number of different sources including, but not limited to, the output of a VCR, DVD player, or other playback or broadcast device that produces video signals that may be copy protected to ensure that unauthorized copies or derivations are not produced.

Figure 2:
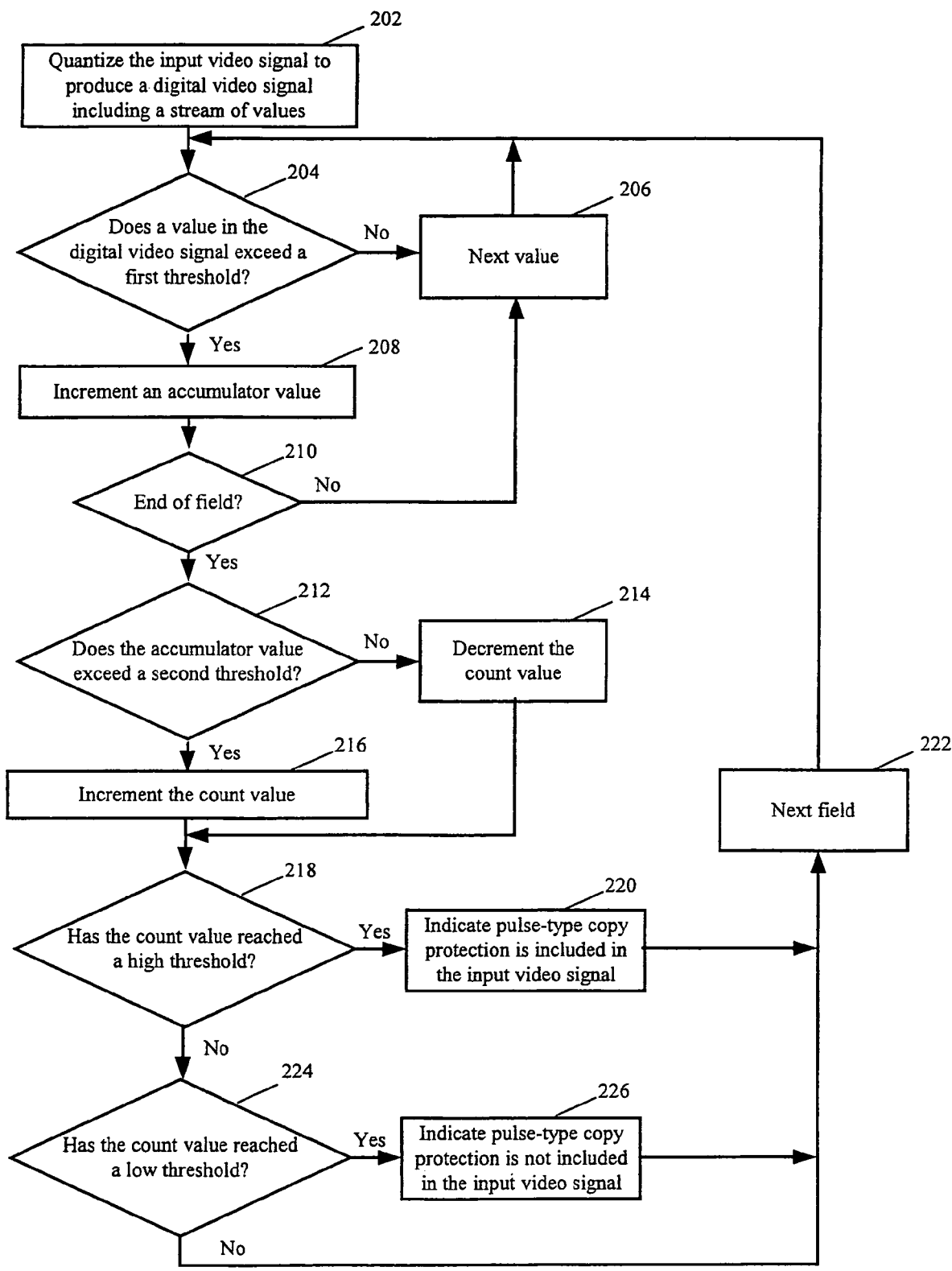
FIG. 2 illustrates a flow diagram of a method for detecting copy protection pulses in an input video signal in accordance with the present invention.
Figure 3:
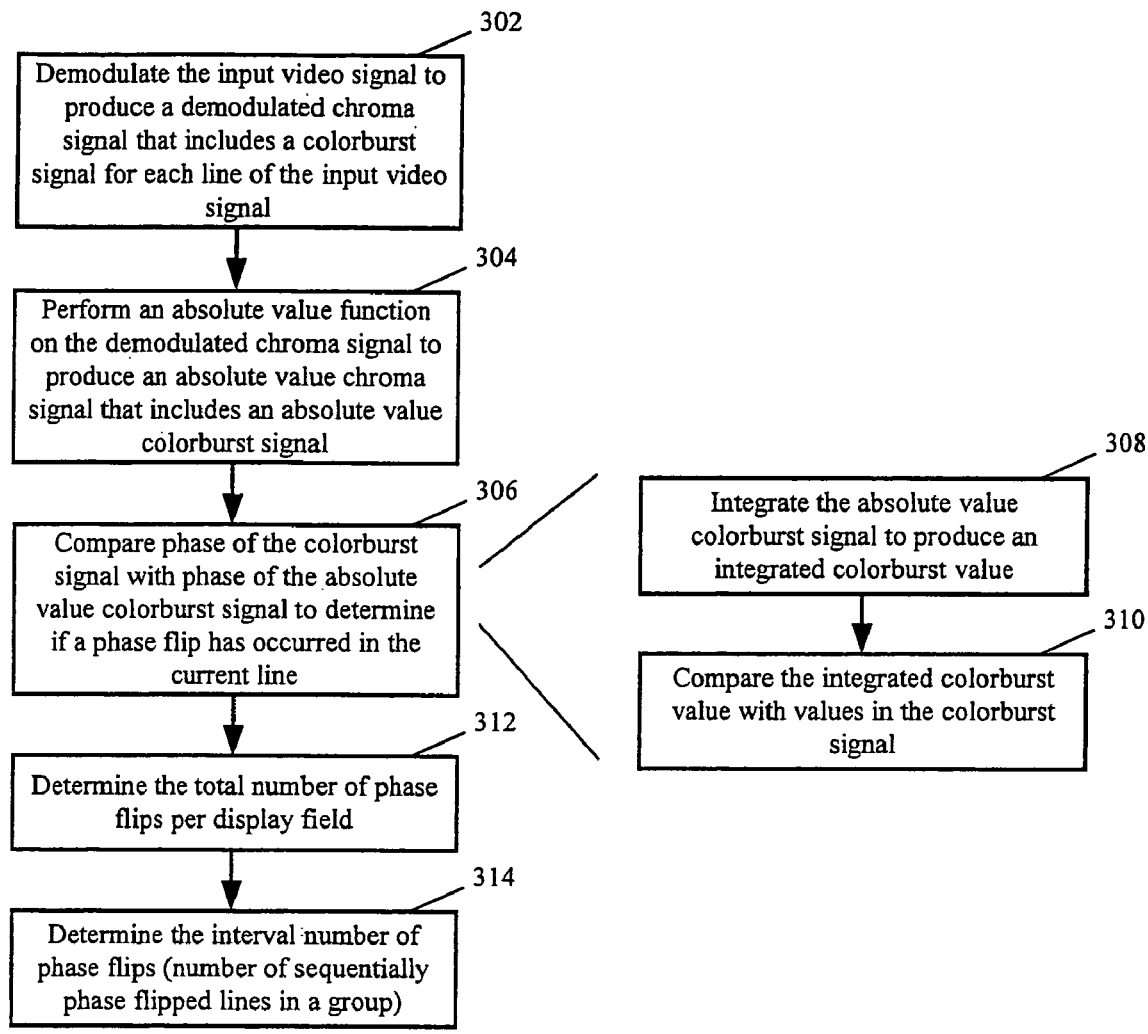
FIG. 3 illustrates a flow diagram of a method for detecting phase flip copy protection in an input video signal in accordance with the present invention.

At step 102, the input video signal is received. At step 104, it is determined whether or not the input video signal includes copy protection. Step 104 may include a number of additional steps, which are described in more detail with respect to FIGS. 2 and 3. FIGS. 2 and 3 illustrate the techniques for detecting two specific types of copy protection often included with video signals. The first type of copy protection often included in video signal is pulses that are typically included in the vertical blanking interval of the video signal. The second type of copy protection involves phase flips that are included in the colorburst portion of certain sets of lines within the display field.

At step 106, the input video signal is converted to component video data. This type of conversion is often provided such that the component video data can be stored in memory on a video graphics integrated circuit prior to recompiling the component data for output. When the input video signal is converted to component video data, the copy protection that may or may not be included within the input video signal is eliminated. This is because the copy protection included in the video signal is typically in addition to the underlying video signal such that the data of the video signal can be separated from the copy protection without disturbing or corrupting the data. The copy protection is often provided in a way such that a television set or other simplistic display device will not be affected by the inclusion of the copy protection, whereas recording devices such as VCRs will be unable to accurately record the underlying video data.

At step 108, an output video signal is generated from the component video data. The output video signal may be provided to a television set, a display monitor, or to another video graphics integrated circuit for additional processing. At step 110 a decision is made based on whether or not it was determined that the input video signal includes copy protection. If the input video signal is not copy protected, no further action is required as there is no need to recreate any copy protection. However, it should be noted that rather than basing the inclusion of copy protection information in the output video stream on the presence of it in the input video stream, other circuitry or software within the video graphics integrated circuit may control the addition or removal of copy protection from an input video signal. Thus, an unprotected input video signal may be provided to the input of the video graphics integrated circuit and copy protection may be added to that signal prior to being provided as an output. Similarly, some type of override may be implemented within the video graphics integrated circuit such that although the copy protection present in the input video signal is normally included in the output video signal, this state can be overridden such that the copy protection is not included in the output video signal. It should be obvious to one of ordinary skill in the art that once the techniques for detecting the presence of copy protection in an input video signal are derived, the uses for such detection technology can vary with respect to the particular application.

If it is determined at step 110 that the input video signal includes copy protection, the method proceeds to step 112, where image capturing functionality within the video graphics controller is disabled. This step ensures that image-capturing applications within devices such as personal computers are not used to capture portions or segments of the input video stream. Thus, the video graphics processor would disallow MPEG, JPEG, or other files that include portions of the input video signal from being created.

At step 114, it is determined whether or not the output video signal is provided to a recordable output. In other words, it is determined whether or not the output video signal is being provided in such a manner that an external recording device could be coupled to receive the output video signal and record the information derived from the input video signal. It should be noted that this step may be eliminated such that any copy protection present in the input video signal is automatically included in all output versions of the input video signal.

If step 114 is included, and it is determined that the output video signal is provided to a non-recordable output such as a LCD display driver, the copy protection included in the input video signal is not recreated in the output video signal.

If it is determined at step 114 that the output video signal is provided to a recordable output, such as a television out signal on a video graphics circuit that may be coupled to the input of a VCR, the copy protection is recreated at step 116 in the output video signal. The recreation of the copy protection prevents recording of information in the output video signal derived from the input video signal. Thus, the method of FIG. 1 determines whether or not copy protection has been included on an input signal, and when it is present, it is recreated in output signals derived from the input signal when those output signals may be subject to recording.

FIG. 2 illustrates a method for detecting copy protection pulses in an input video signal. The method of FIG. 2 may be utilized at step 104 of FIG. 1 to determine if the input video signal includes this type of copy protection. The method of FIG. 2 begins at step 202 where the input video signal is quantized, or digitized, to produce a digital video signal that includes a stream of values. Each of the values within the stream represents a quantized portion of the input video signal.

At step 204, each of the values in the digital video signal is individually compared with a first threshold. Preferably, the comparison of the values in the stream with the first threshold occurs in a serial manner. In the preferred embodiment, the first threshold is a vertical blanking interval peak white threshold, and the comparison at step 204 is performed to determine if automatic gain control pulses within the input video signal exceed the vertical blanking interval peak white threshold. The amplitude of the portion of the input video stream is compared with this threshold in order to determine if it has been exceeded.

If it is determined at step 204 that the first threshold is not exceeded by the portion of the input video stream, the method proceeds to step 206 where the next value of the input video stream is prepared for comparison. If it is determined at step 204 that the value does exceed the threshold, the method proceeds to step 208 where an accumulator value is incremented. At step 210, it is determined whether or not the end of a display field has been reached. If not, steps 204-208 continue to be executed with subsequent values in the input video stream. Thus, steps 204-210 effectively count the number of pulses, or values included in each display field that exceed the first threshold, which is preferably the vertical blanking interval peak white threshold. The accumulator value is cleared at the end of each frame.

In the form of copy protection that may be included in an input video signal that this technique is attempting to detect, a certain number of automatic gain control (AGC) pulses are included in each display field of the input video stream. These pulses prevent videocassette recorders and other similar recording devices from effectively recording the information in the input video stream. Such pulses are often varied, or pulsated, from field to field such that their amplitude changes from one field to the next. As such, in some fields the pulses may not exceed the first threshold, whereas in other fields the threshold will be exceeded.

In order to ensure that the detection circuitry does not continually switch back and forth from the states of detecting and not detecting the presence of the AGC pulses, the system is configured to react slowly to the presence or absence of these pulses. At step 212, the accumulator value, or number of pulses within the previous field, is compared with a second threshold. The second threshold is associated with the number of pulses expected to be included within a field for the copy protection to be present. If the accumulator value for particular field is determined to be below the second threshold, the method proceeds to step 214 where a count value that monitors the number of fields having a sufficient number of pulses is decremented. If the accumulator value exceeds the second threshold, the count value is incremented at step 216. Thus, a running count is maintained as to the number of fields in the input video stream that include a sufficient number of AGC pulses for the presence of copy protection to be detected.

Preferably, the count value incremented and decremented by steps 214 and 216 is maintained in a counter of limited size. Thus, when copy protection is present within an input video signal, the count value will gradually build up as fields including a sufficient number of pulses are detected. Because the pulses are known to vary in amplitude from one field to the other such that in some fields they will not be detected, this count will not continually increment, but will decrement when those fields with pulses of insufficient amplitude are received. However, it is recognized that the presence of these pulses will occur in more than half of the fields, and therefore, the count will increase in value over time.

At step 218, it is determined whether or not the count value has reached a high threshold. This comparison determines whether or not the counter has built up to a sufficient level that it can reasonably be assumed that copy protection is present in the input video stream. Once the high threshold has been reached, the method proceeds to step 220 where an indication is generated that pulse type copy protection is included in the input video signal. If the count value has not yet reached the high threshold, the method proceeds from step 218 to step 224 where it is determined whether or not the count value has reached a low threshold. If the count value has reached the low threshold, an indication will be generated at step 226 that pulse type copy protection is not included in the input video signal. If the comparisons at step 218 and 224 are both negative and neither threshold has been reached either in the positive counting direction or the negative counting direction, the method will proceed from step 224 to step 222 where the next field of the input video stream is prepared for comparison with the various thresholds that will detect if copy protection is present.

Thus, the method of FIG. 2 steps through the input video signal on a field by field basis determining if sufficient pulses are included in each field to surpass a threshold number of pulses that should be included in the frame to suggest that copy protection may be present. When this threshold is exceeded, a count value is incremented, and when it is not, the count value is decremented. This count value is then compared with high and low thresholds to determine if a sufficient number of fields have been shown to include the pulses that it is probable that copy protection exists.

It should be noted that the first, second, high, and low thresholds may be configured based on the particular version of pulse type copy protection that is attempting to be detected. The high and low thresholds are often configured such that some level of hysteresis exists between the high and low thresholds. For example, assume that an input video signal that includes pulse type copy protection is being received. The majority of the fields within the input video signal will include a number of pulses exceeding the second threshold such that the count value is incremented more often than it is decremented. As the count value builds up, it will eventually reach the high threshold. When this occurs, the presence of copy protection is flagged. Eventually, the count value will reach the maximum value of the counter, and remain near this value until an input signal that lacks copy protection is received. At this point, the lack of pulses in the fields within the non-copy protected input signal will cause the count value to be decremented. Although it passes the high threshold on its downward count, the count value will not turn off the copy protection indication until it reaches the low threshold.

FIG. 3 illustrates a flow diagram of a method for detecting phase flip copy protection in an input signal, which may be used for copy protection detection at step 104 of FIG. 1. The type of copy protection detected by the method of FIG. 3 includes phase flips in a portion of the colorburst signal that is part of each line in a display field. The colorburst signal is used by television sets as a reference to decode the color to be used with each portion of the video signal. Television sets are typically slow to react to any phase flips included within the colorburst portions of the input video. signal, whereas recording devices such as VCRs are unable to decode and record the color properly when such phase flips are included in the video stream.

Each line of video data includes a synchronization pulse typically followed by a colorburst signal, which is often some form of sine wave. In the phase flip copy protection technique, portions of the sine wave are flipped by a 180 degrees in phase and then reverted to their original phase at a later time. As stated earlier, recording devices are typically incapable of dealing with these phase flips, whereas television sets will not react fast enough to be affected. The copy protection technique that includes these phase flips typically includes them in 3 or 4 sequential lines of a display field, where these sets of 3 or 4 phase flip lines are typically repeated at regular intervals throughout the field. In order to accurately detect the type of phase flip protection included in an input video signal, the number of lines within which a phase flip is included on a field by field basis should be maintained, along with the interval count which indicates how many lines in a row are included in each of the phase flip groupings within each field.

The detection method of FIG. 3 begins at step 302 where the input video signal is demodulated to produce a demodulated chroma signal that includes a colorburst signal for each line of the input video signal. At step 304, an absolute value function is performed on the demodulated chroma signal to produce an absolute value chroma signal that includes an absolute value colorburst signal. By taking the absolute value of the colorburst signal, any phase flips are eliminated, as the resulting signal is entirely positive.

At step 306, phase of the colorburst signal is compared with phase of the absolute value colorburst signal to determine if a phase flip has occurred in the current line. This may be accomplished by steps 308 and 310. At step 308, the absolute value of the colorburst signal is integrated to produce an integrated colorburst value. At step 310, the integrated colorburst value, or some derivative thereof, is compared with values in the colorburst signals to determine if the phase flip has occurred. Integrating the colorburst signal allows for a better overall comparison than if the absolute value colorburst signal were compared directly with the non absolute value colorburst signal. In one embodiment, the integrated value is divided by two prior to comparison.

At step 312, the total number of phase flips per display field is determined. Thus, steps 302 through 306 detect each individual phase flip within a field, and step 312 maintains a running count of the number of phase flips that occurs within each field. At step 314, the interval number of phase flips within a field is determined. As stated earlier, the interval number of phase flips is equivalent to the number of phase flips in each grouping of phase flips present in a field. For example, in a field where 40 phase flips occur, and the interval number of phase flips is 4, there will be 10 different groupings within the field where within each grouping there are 4 lines that include phase flips.

By detecting the total number of phase flips and the interval number of phase flips, these numbers can be compared with known values to determine if this phase flip type of copy protection has been included in an input video signal. When this type of copy protection has been included, these numbers can also be used in the regeneration of the copy protection for inclusion in output video signals.

Figure 4:
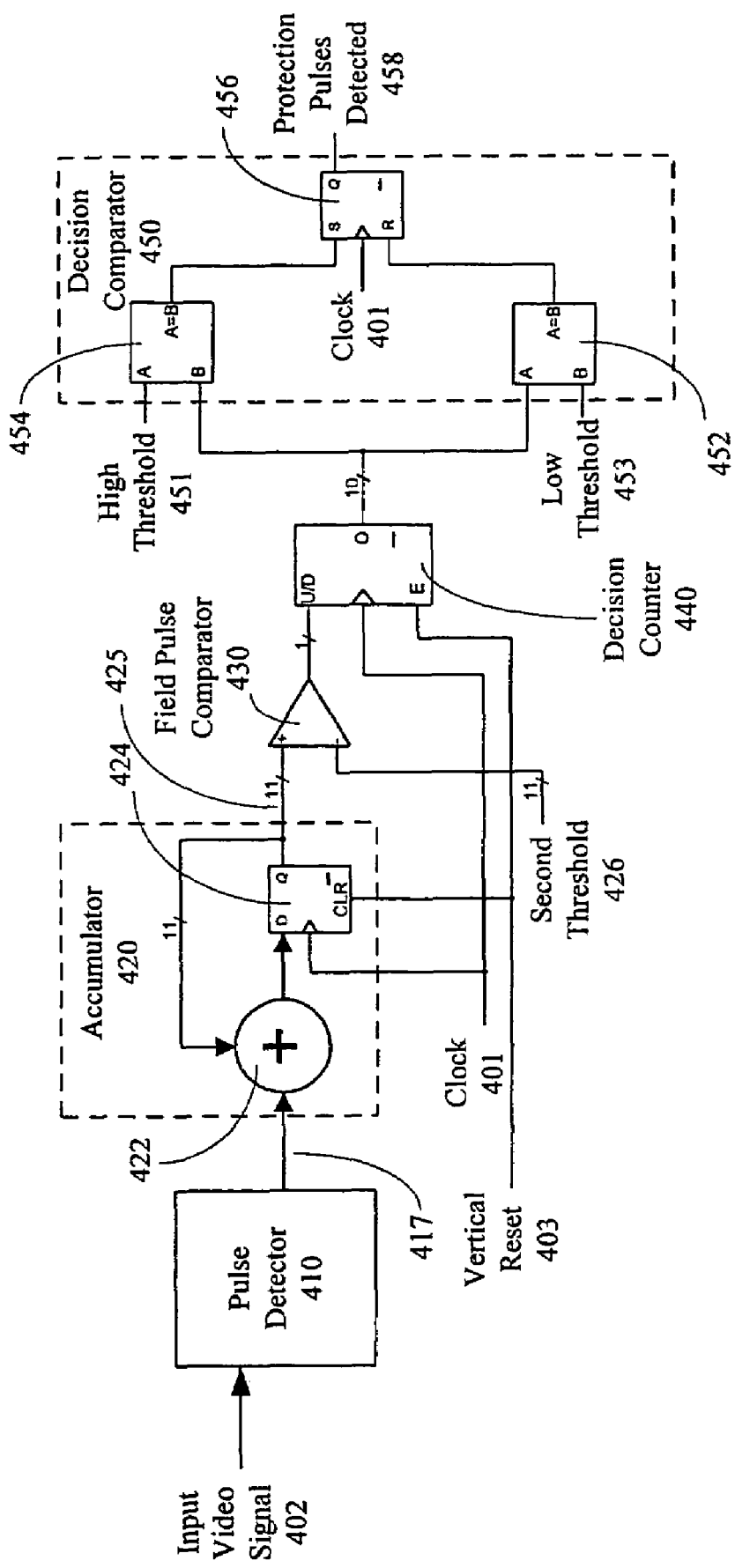
FIG. 4 illustrates a block diagram of a copy protection pulse detection circuit in accordance with the present invention.

FIG. 4 illustrates a copy protection pulse detection circuit that includes a pulse detector 410, an accumulator 420, a field pulse comparator 430, a decision counter 440, and a decision comparator 450. The pulse detector 410 receives an input video signal 402 and sets a pulse detect indication 417 each time a pulse that exceeds a first threshold is detected in the input video signal 402.

Figure 5:
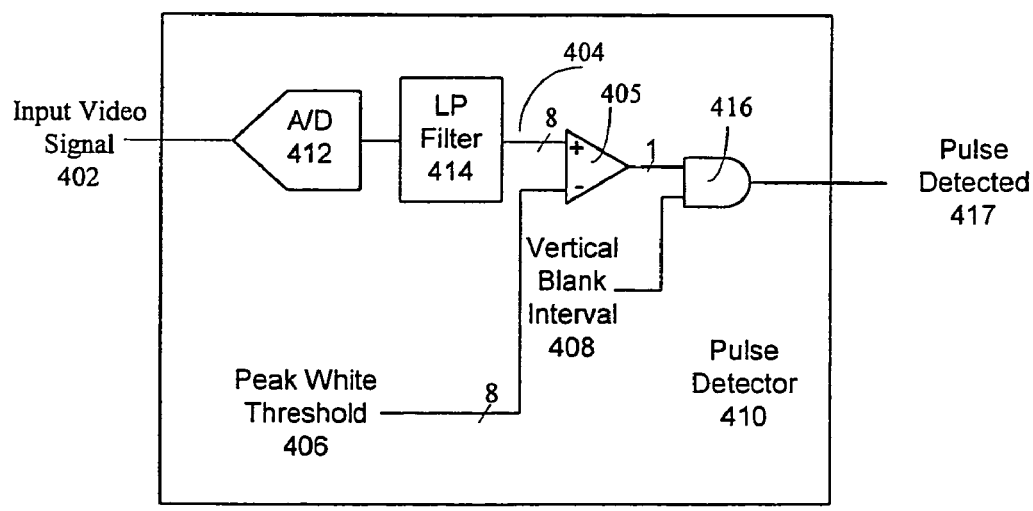
FIG. 5 illustrates a more detailed view of the pulse detector of FIG. 4.

FIG. 5 illustrates a more detailed view of one embodiment of the pulse detector 410. The pulse detector 410 includes an analog to digital converter (AID) 412 that receives the input video signal 402 and converts it to a digital input signal. The digital input signal is passed to a low pass filter 414 that filters the digital input signal to produce a filtered input signal 404. A pulse detection comparator 405 operably coupled to the low pass filter compares digital values in the filtered input signal 404 with a first threshold, which is preferably the vertical blanking interval peak white threshold 406. Comparison of the digital values with the first threshold determines whether or not there are pulses within the input video signal 402 that exceed the threshold, which are typically the type of pulses associated with the pulse type copy protection.

The pulse detector 410 also preferably includes a blanking interval gate 416 that receives the output of the pulse detection comparator 405 and gates it with the vertical blank interval signal 408 such that pulses are only detected during the vertical blank interval.

Returning to FIG. 4, the accumulator 420 is operably coupled to the pulse detector 410, and the accumulator 420 counts a number of pulses detected in each field of the input video signal to produce an accumulated count 425. The accumulated count of the accumulator 420 is preferably cleared by a vertical reset signal 403, which indicates the transition between fields in the input video signal 402. The vertical reset signal 403 may correspond to the vertical-blanking interval present in typical video signals.

Preferably, the accumulator 420 includes an adder 422 and a register set 424 that stores the current accumulated count. The register set 424 receives the vertical reset signal 403 as a clear signal, and is also coupled to receive the system clock signal 401. The current value stored in the accumulated count register set 424 (accumulated count 425) is provided as an input to the adder 422 along with the pulse detect signal 417.

The accumulated count 425 is provided to the field pulse comparator 430 along with a second threshold 426. Preferably, the second threshold 426 indicates the minimum number of pulses that should be present in a particular field to indicate that copy protection is present in that particular field. The field pulse comparator 430 compares the accumulated count 425 with the second threshold 426 such that when the accumulated count 425 exceeds the second threshold 426, the field pulse comparator asserts a positive count indication for the field.

The decision counter 440 is operably coupled to the field pulse comparator 430, and, on a field by field basis, the decision counter 440 will increment or decrement a decision count based on the positive count indication received from the field pulse comparator 430. If in a particular field the field pulse comparator 430 generates a positive count indication, the decision counter 440 will be incremented. Thus, if enough pulses are detected within a field, the decision counter 440 will increment. If enough pulses are not detected as indicated by the field pulse comparator 430, the decision counter 440 will decrement. The decision counter 440 is shown as an up/down counter that counts upwards when the field pulse comparator asserts a positive indication and downwards for a negative indication. The decision counter 440 receives the clock signal 401, and is enabled by the vertical reset signal 403 such that it only increments or decrements on field boundaries.

Preferably, the decision counter 440 is of limited size such that a maximum count value will eventually be achieved when an input video signal having pulse copy protection is received. When such a signal is received, the decision counter 440 will begin to increment as pulses are detected, and eventually will reach the high threshold 451. The decision comparator 450 will detect that the decision count has reached the high threshold, and at this point it will set a protection pulses detected signal 458. This indicates that pulses have been detected and informs the rest of the video graphics system that copy protection in the form of pulses within the input video signal 402 has been detected. Similarly, if the input video signal 402 changes and reverts to a signal that no longer has such copy protection, the decision counter 440 will decrement, eventually passing the high threshold 451 and reaching the low threshold 453. When the decision count reaches the low threshold 453, the decision comparator 450 will clear the protection pulses detected signal 458, thus indicating that copy protection in the form of pulses is not present on the input video signal 402.

Preferably, the decision comparator 450 includes 2 comparison blocks 454 and 452 that compare the decision count with the high threshold 451 and the low threshold 453. The decision comparator 450 also preferably includes a set/reset flip-flop 456, where the set input of the flip-flop 456 is coupled to the output of the high threshold comparator 454, whereas the reset input of the flip-flop 456 is coupled to the low threshold comparator 452. The flip-flop 456 also receives the system clock signal 401. In this configuration, when the high threshold 451 is achieved by the decision count, the set input to the flip-flop 456 will be asserted, thus bringing the protection pulses detected signal 458 to a high state. When the low threshold 453 is reached by the decision count, the flip-flop 456 is reset such that the protection pulses detected signal 458 is cleared.

Preferably, the circuit illustrated in FIG. 4 is included in a video graphics integrated circuit that may be included on a video graphics card for use in a personal computer. As such, the circuit illustrated in FIG. 4 is able to detect when pulse type copy protection is being employed in an input video signal, and is able to inform the remainder of the video graphics circuit of the presence of such copy protection. This enables the video graphics integrated circuit to recreate the copy protection in any output video signal that may be recorded, as well as shut down any image capturing functions within the video graphics integrated circuit.

Figure 6:
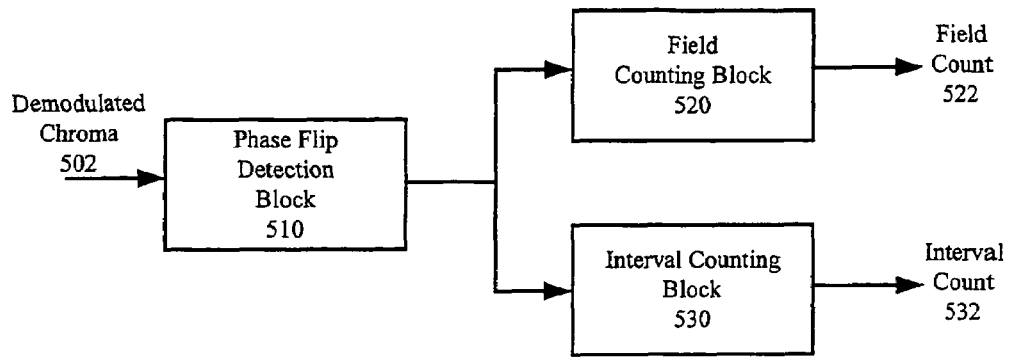
FIG. 6 illustrates a block diagram of a colorburst phase flip detection circuit in accordance with the present invention.

FIG. 6 illustrates a colorburst phase flip detection circuit that includes a phase flip detection block 510, a field counting block 520, and an interval counting block 530. The phase flip detection block 510 receives a demodulated chroma signal 502 and detects when a phase flip is included in a colorburst portion of the chroma signal. The phase flip detection block 510 checks each line of each field of the demodulated chroma signal for phase flips. When the phase flip detection block determines that a phase flip has occurred in a line, the phase flip detection block sets a flip detected indication. The flip detected indication is cleared based on a line boundary indication, which preferably includes a horizontal reset signal associated with horizontal blanking intervals typically included in video signals.

The field counting block 520 is operably coupled to the phase flip detection block 510 and determines a field count equal to the number of phase flips per field. The field counting block 520 determines the number of flips per field based on the flip detected indication from the phase flip detection block 510 and a field boundary indication. Preferably, the field boundary indication is a vertical reset signal associated with the vertical-blanking interval that is typically included in video signals.

The interval counting block 530 is also operably coupled to the phase flip detection block. The interval counting block determines an interval count equal to a number of consecutive lines having phase flips. Thus, phase flips within each field typically occur in groups of consecutive lines. The interval counting block determines the number of lines included in each of these groups. Thus, repeating the example discussed earlier with respect to FIG. 3, if a single display field includes 40 phase flips and they are in groups of 2, the frame count will be equal to 40, whereas the interval count will be equal to 2. Each of the intervals will be spaced throughout the field.

By determining the field count and the interval count, the phase flip detection circuit of FIG. 6 is able to indicate to other portions of a video graphics circuit the type of phase flip copy protection included in a particular video signal. As such, the video graphics circuit can shut down any image capturing capabilities within the video graphics circuit when copy protection is present, and also is able to recreate the phase flip copy protection included in the input signal on any output signal that includes the data from the input signal.

Figure 7:
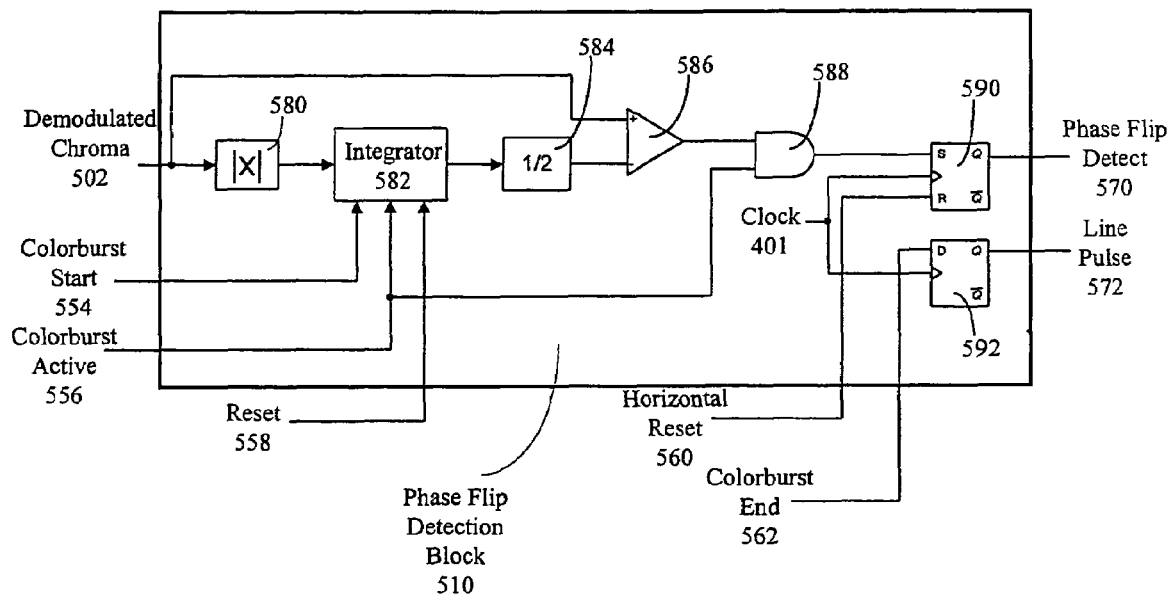
FIG. 7 illustrates a block diagram of a more detailed view of the phase flip detection block of FIG. 6.
Figure 8:
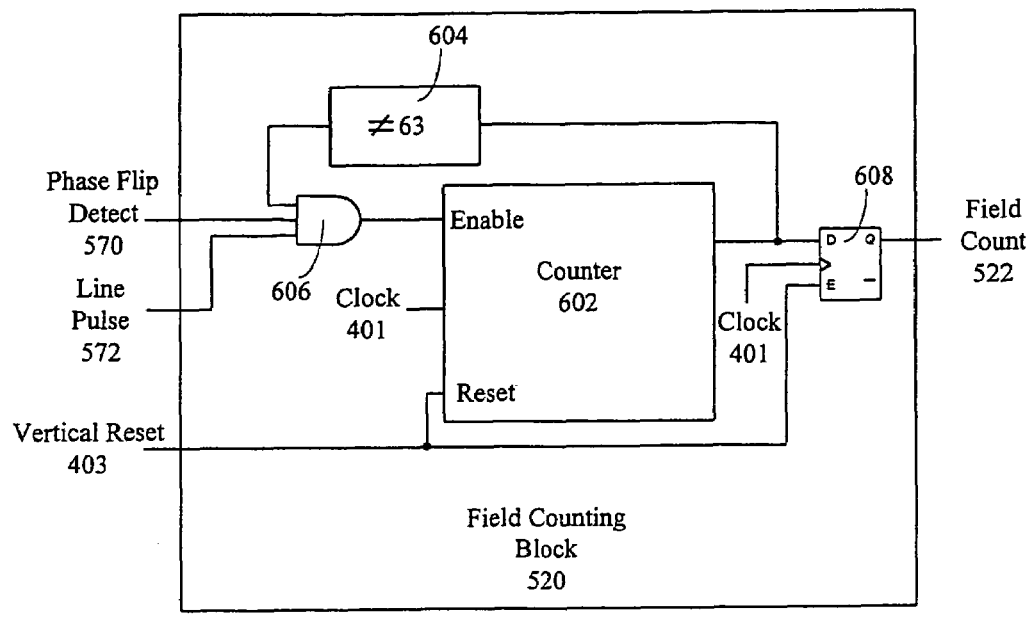
FIG. 8 illustrates a block diagram of a more detailed view of the field counting block of FIG. 6.
Figure 9:
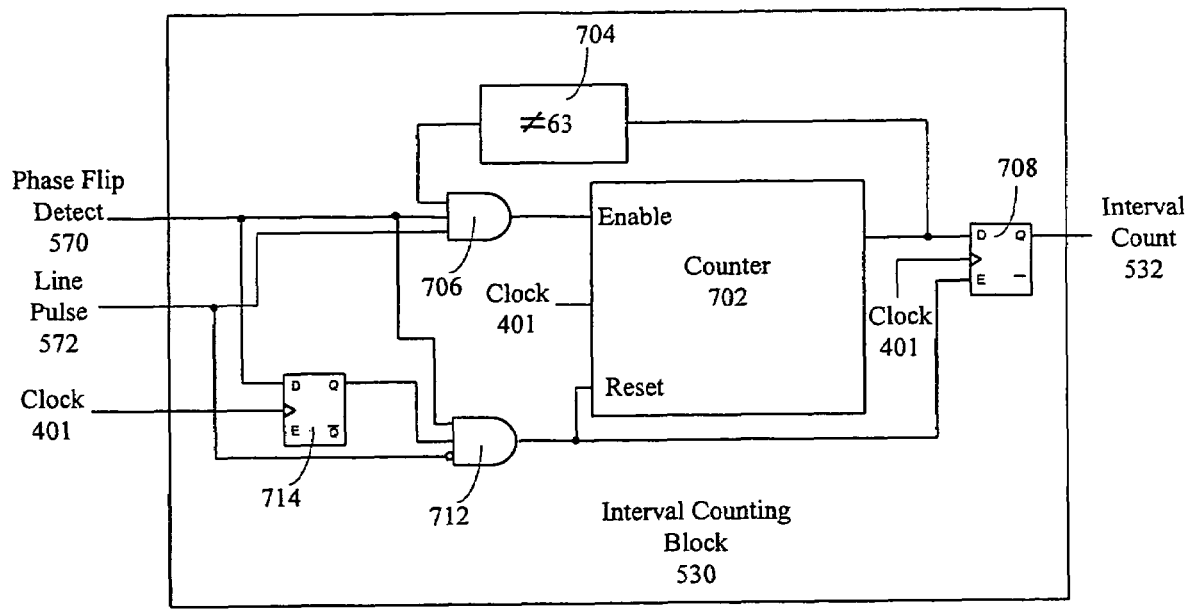
FIG. 9 illustrates a block diagram of a more detailed view of the interval counting block of FIG. 6.

The individual blocks of the phase flip detection circuit for one embodiment are illustrated in greater detail in FIGS. 7-9. FIG. 7 illustrates the phase flip detection block 510 in greater detail. Phase flip detection block 510 receives the demodulated chroma signal 502. An absolute value block provides the absolute value of the demodulated chroma signal 502 of this signal to an integrator 582. The integrator 582 receives a colorburst start signal 554 that indicates the beginning of a colorburst portion of a particular line of video data. The integrator 582 also receives a colorburst active signal 556 that informs the integrator 582 that the colorburst portion of the line is still active. The integrator 582 also receives a reset signal 558.

The integrator 582 integrates the absolute value chroma signal which is then provided to a dividing block 584 that divides the integrated value in half. The result of the dividing block 584 is provided to a comparator 586 along with the demodulated chroma signal 502 as received by the phase flip detection block 510. The comparator 586 compares the integrated value with instantaneous values in the demodulated chroma signal 502 and detects whether or not it appears a phase flip has occurred. The AND gate 588 combines the output of the comparator 586 and the colorburst active signal 556 and to produce an indication as to whether a phase flip appears to have occurred in a particular colorburst portion of a line.

An S-R flip-flop 590 is used to generate the phase flip detect signal 570. When the AND gate 588 indicates that a phase flip has been determined within a colorburst portion of a line, the set input to the flip-flop 590 is asserted, thus setting the phase flip detect output 570. Note that the flip-flop 590 is clocked by the system clock 401 and is reset on a line by line basis by the horizontal reset signal 560. In order to facilitate downstream circuitry within the phase flip detection circuit, a line pulse 572 is generated from the clock 401 and a colorburst end signal 562 that signifies when the end of the colorburst has been reached. The line pulse signal 572 generated by the flip-flop a pulse that is asserted on a line by line basis at the end of the colorburst.

FIG. 8 illustrates a more detailed view of the field counting block 520. The field counting block 520 includes a counter 602 that is preferably a 5-bit counter such that it can count between 0 and 63, where a count of 63 indicates that the counter 602 is saturated. The counter 602 is reset based on a vertical reset signal 403 such that it is cleared at the end of each field. The counter 602 is clocked by the system clock 401 and enabled by the output of an AND gate 606. The inputs to the AND gate 606 include the line pulse signal 572 and the phase flip detect signal 570 from the phase flip detection block 510. The other input to the AND gate 606 is the output of a block 604 that determines whether or not the counter 602 is saturated. Once per line the line pulse signal 572 will be high. If, when the line pulse signal 572 is high, the phase flip detect signal 570 is also high and the counter 602 is not saturated, the enable input to the counter 602 will be high, and the counter 602 will increment.

Once per field, the register set 608 is enabled by the vertical reset signal 403. The register set 608 receives as its input the output of the counter 602. Thus, once per field the output of the counter 602 will be loaded into the register set 608 as the field count 522. Therefore, the field count 522 represents the total number of phase flips detected during a particular field.

FIG. 9 illustrates a more detailed view of an interval counting block 530 which includes a counter 702. As in FIG. 8, the counter 702 is preferably a 5-bit counter that saturates at a value of 63. The enable input to the counter is coupled to an AND gate 706 in the same manner as the enable of the counter 602 of FIG. 8. Similarly, the inputs to the AND gate 706 include the phase flip detect signal 570, the line pulse signal 572, and the output of a block 704 that indicates whether or not the counter 702 is saturated.

The counter 702 is reset in a different manner than the counter 602. The reset input to the counter 702 is coupled to the output of an AND gate 712 that receives the inverse of the line pulse 572, the phase flip detect signal 570, and a delayed version of the phase flip detect signal 570 as its inputs. The delayed version of the phase flip detect signal 570 is generated by the flip-flop 714. The reset signal of the counter 702 is therefore only asserted when the end of a group of consecutive phase flips is reached. Thus, when sequential phase flips are detected on multiple lines, the counter 702 will continue to increment until the end of the sequential run of phase flips is reached. At this point the register set 708 will be enabled, and the output of the count 702 will be loaded into the register set 708 as the interval count 532. Thus, the interval count 532 determines the number of lines in a group of phase flips.

It should be noted that the circuitry illustrated in FIGS. 4-9 are views of a particular embodiment. It should be apparent to one of ordinary skill in the art that many different variations of the circuits could be implemented which would have the same overall functionality. It should also be apparent that at least a portion of the functions of the circuitry could be implemented in software. For example, the counters could be maintained in software.

It should be noted that each of the two different types of copy protection described herein may be included in a particular input video stream. As such, separate circuitry may be used to detect each of the types of copy protection such that if either is present it can be included in the appropriate output signals. Thus, one or both of the two types of copy protection may be detected and included in the output video signal.

It should be understood that the implementation of variations and modifications of the invention and its various aspects will be apparent to those of ordinary skill in the art, and the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A copy protection pulse detection circuit, comprising:
  a pulse detector, wherein the pulse detector receives an input video signal and sets a pulse detect indication each time a pulse that exceeds a first threshold is detected in the input video signal;
  an accumulator operably coupled to the pulse detector, wherein the accumulator counts a number of pulses received in each field of the input video signal to produce an accumulated count;
  a field pulse comparator operably coupled to the accumulator, wherein the field pulse comparator compares the accumulated count for each field with a second threshold, wherein when the accumulated count exceeds the second threshold for a field, the field pulse comparator asserts a positive count indication for the field;
  a decision counter operably coupled to the field pulse comparator, wherein the decision counter increments a decision count when the positive count indication is asserted for a field and decrements the decision count when the positive count indication is not asserted for a field; and
  a decision comparator operably coupled to the decision counter, wherein when the decision count reaches a high threshold, the decision comparator sets a pulses detected indication, wherein when the decision count reaches a low threshold, the decision comparator clears the pulses detected indication.

2. The copy protection pulse detection circuit of claim 1, wherein the pulse detector further comprises:
  an analog to digital converter that converts the input video signal to a digital input signal;
  a low pass filter operably coupled to the analog to digital converter, wherein the low pass filter filters the digital input signal to produce a filtered input signal; and
  a pulse detection comparator operably coupled to the low pass filter, wherein the pulse detection comparator compares digital values in the filtered input signal with the first threshold, wherein the pulse detection comparator sets the pulse detect indication each time a digital value exceeds the first threshold.

3. The copy protection pulse detection circuit of claim 2, wherein the pulse detector further comprises a blanking interval gate, operably coupled to the pulse detection comparator, wherein the blanking interval gate selectively passes the pulse detect indication based on a received signal indicating that the input video signal is in the vertical blanking interval.

4. The copy protection pulse detection circuit of claim 3, wherein the detection circuit is included on a video graphics integrated circuit.

* * * * *

UNITED STATES PATENT AND TRADEMARK OFFICE
CERTIFICATE OF CORRECTION

PATENT NO. : 7,603,025 B2
APPLICATION NO. : 10/731217
DATED : October 13, 2009
INVENTOR(S) : Antonio Rinaldi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this

Fifth Day of October, 2010

David J. Kappos
*Director of the United States Patent and Trademark Office*